(12) United States Patent
Rizzi (10) Patent No.: US 7,541,918 B1
(45) Date of Patent: Jun. 2, 2009

(54) AUTOMATIC ACCELERATION, DECELERATION AND BRAKE LIGHTS EARLY WARNING SYSTEM FOR MOTORIZED VEHICLES

(76) Inventor: Joseph J. Rizzi, 7268 W. 88th Pl., Los Angeles, CA (US) 90045

( * ) Notice: Subject to any disclaimer, the term of this patent is extended or adjusted under 35 U.S.C. 154(b) by 548 days.

(21) Appl. No.: 11/408,549

(22) Filed: Apr. 21, 2006

Related U.S. Application Data (60) Provisional application No. 60/674,319, filed on Apr. 25, 2005.

(51) Int. Cl.
  *B60Q 1/00* (2006.01)
  *B60Q 1/26* (2006.01)
(52) U.S. Cl. ............................ 340/438; 362/541
(58) Field of Classification Search ................. 340/438, 340/479, 467, 463, 464, 468, 471, 472; 362/539–541, 362/485–488
See application file for complete search history.

(56) References Cited

U.S. PATENT DOCUMENTS

| | | | | |
|---|---|---|---|---|
| 4,823,109 A | * | 4/1989 | Boyer | 340/467 |
| 4,916,431 A | * | 4/1990 | Gearey | 340/479 |
| 5,376,918 A | * | 12/1994 | Vinciguerra et al. | 340/479 |
| 5,504,472 A | * | 4/1996 | Wilson | 340/479 |
| 6,911,917 B2 | * | 6/2005 | Higgs | 340/908 |
| 7,296,551 B2 | * | 11/2007 | Murata et al. | 123/184.24 |

* cited by examiner

*Primary Examiner*—Jeff Hofsass
*Assistant Examiner*—Sigmund Tang
(74) *Attorney, Agent, or Firm*—Thomas I. Rozsa (57) ABSTRACT

The present invention relates to a light signaling system apparatus for motorized vehicles and a process for installing said system. This invention relates to a light signaling system for motor vehicles wherein the lights may be positioned in any location on any motorized vehicle. Specifically a vacuum sensing device is incorporated into an internal combustion engine such that the vacuum sensing device completes a circuit and turns on a desired light when a driver accelerates, decelerates, or maintains a constant velocity in order to alert others of the driver's intentions.

5 Claims, 4 Drawing Sheets

AUTOMATIC ACCELERATION, DECELERATION AND BRAKE LIGHTS EARLY WARNING SYSTEM FOR MOTORIZED VEHICLES

PRIORITY CLAIM

This application is a non-provisional application, claiming the benefit of priority to provisional application No. 60/674,319, filed in the United States Patent and Trademark Office on Apr. 25, 2005, and entitled "Automatic Acceleration, Deceleration and Brake Lights Early Warning System for Motorized Vehicles".

BACKGROUND OF THE INVENTION

1. Field of the Invention

The present invention relates to an apparatus and method for a vacuum and oil pressure based system for detection of vehicle acceleration, deceleration and light signaling system to warn drivers that the vehicle ahead of them will slow down or speed up.

2. Description of the Prior Art

Rear ending accidents are the most prevalent types of automotive accidents. The method of the present invention differs from that of all prior art radar based warning devices in that it is totally free from interference caused by other vehicles. The problem with prior art warning devices is interference due to the signals bouncing off oncoming vehicles or passing vehicles that pull ahead. The previous prior art vehicle warning devices have not been widely accepted because of the excessive complexity or their design and the resultant cost of manufacturing. In addition, most prior art systems do not perform as claimed.

The known prior art advocates the use of pendulums, mercury switches or radar or laser beams or sonar to achieve hopeful results. They have real disadvantages not to mention very large costs. Pendulums are only brought into play by the initial inertia of starting and stopping. They are not constant. Many prior art devices are nightmares to produce based on engineering complexity and production costs. These and other systems are subject to wear and tear and failure due to swiveling housings, linkages, hinges, swinging contact points, sliding contact points and oxidation. Recently are all kinds of technology of dubious value such as bells, whistles, vibrators and decelerators have been introduced which are mostly worthless in stop-and-go freeway traffic.

This present inventor applicant does not favor radar because the signal fans out and false alarms result. Recent tests on a Land Rover LR3 (Wall Street Journal Nov. 19, 2004) stated "Beeping alerts were more annoying than helpful," especially going around curves or those vehicles that are passing on the left or right side. Distance detectors are useless in heavy stop-and-go traffic and would be very annoying. With the use of laser beams, there is the danger of a laser hitting the eyes of either a driver or a pedestrian on the sidewalk. Alarms, whistles, internal cabin warning buzzers and lights are truly irritating. People would pay to have them disconnected. Screens on vehicle dashboards are more dangerous than the use of cell phones because they encourage drivers to take their eyes off the road.

Research has shown that pedestrians as a percentage of all traffic fatalities are as follows: New York=28.3%, Miami=22.8%, San Diego=22.5%, San Francisco=21.7%, Los Angeles=21.3%. In the prior art, highly complex patents require road crossings and intersections to be wired with signals in order to indicate the status of the crosswalk and traffic light in order for a vehicle to respond to the light and initiate an automatic braking sequence. The implementation of such a system is unlikely due to economic reasons. Therefore, there is a need for an alerting device that can alert a pedestrian of the intention of a driver in an oncoming vehicle.

The current invention system is far superior to systems that only alert a driver who is about to be rear ended because flashing a vehicle's brake lights at a vehicle that is following too closely will only cause the driver of the vehicle to slam on his brakes and be rear ended by the following vehicle, possibly starting a chain reaction with all of the other vehicles in front of the following vehicles. It might be desirable to only have one color displayed and the inventor suggests amber which is an alerting color. These lights might also be placed on rear protruding tail pipes.

SUMMARY OF THE INVENTION

The present invention relates to an apparatus and method of a vacuum and oil pressure based system for detection of vehicle acceleration, deceleration and a light signaling system. The apparatus for the automatic acceleration, deceleration and brake lights early warning system for motorized vehicles can be incorporated into any vehicle where the vehicle is wholly or partially propelled with an internal combustion engine. The apparatus is further comprised of a vacuum sensing device attached to the intake manifold of the vehicle. Upon detection of a low engine vacuum, a colored light, preferably green, is turned on while a second light, preferably yellowish orange (amber) remains off. Upon further detection of a high engine vacuum an amber light is activated alerting other motorist and pedestrians of a potential breaking situation.

Specifically, an apparatus for automatic acceleration, deceleration and brake lights early warning system for motorized vehicles is provided. The present apparatus comprises a motorized vehicle with an internal combustion engine wherein the intake manifold is configured with a plurality of adjustable vacuum sensing devices calibrated to a particular engine wherein said plurality of adjustable vacuum sensing devices are configured to turn on at least one colored warning light. Amber is the preferred warning light color for alerting fellow motorists and pedestrians of a decelerating vehicle.

Colored warning lights are selected from a group consisting of light bulbs, a high glow three inch to five inch neon bulb, a low glow three inch to five inch neon bulb; and a light emitting diode (LED's). At least two differently colored warning lights are fixedly attached to the motorized vehicle at a location to be selected from: the front corners of the bumpers, the front corners of the fenders, on the front and or rear license plates, the motorized vehicle's rear window, the dashboard facing forward, and any combination thereof.

One of said plurality of adjustable vacuum sensing devices is particularly calibrated to discern a low vacuum induced by the act of acceleration and an intermediate vacuum induced by constant velocity. A second of said plurality of adjustable vacuum sensing devices is particularly calibrated to discern a high vacuum induced by the act of deceleration. The present invention includes at least two colored lights fixedly attached to said motorized vehicle whereby the first of the at least two said lights is configured to correlate with the act of acceleration and constant velocity by:

1. Turning on when the vacuum measured by said vacuum device correlates with said low and intermediate vacuum reading.

The second of the at least two said lights is configured to correlate with the act of deceleration by:
1. turning on when the vacuum measured by said vacuum device correlates with said high vacuums, and
2. turning off when the vacuum measured by said vacuum device no longer correlates with said high vacuums.

In another aspect, the apparatus for automatic acceleration, deceleration and warning lights early warning system for motorized vehicles as set forth above includes an optional flasher which may be installed in order to pulse on and off said deceleration light which is configured to turn on during the act of deceleration.

In yet another aspect, the present invention comprises an apparatus for automatic acceleration, deceleration and warning lights early warning system for motorized vehicles comprising: a motorized vehicle with an internal combustion engine wherein the intake manifold is configured with an adjustable vacuum sensing device calibrated to a particular engine wherein the adjustable vacuum sensing device is configured to selectively turn on and off an at least one warning light.

The lights are selected from a group consisting of light bulbs, a high glow 3 inch to five inch neon bulb, a low glow 3 inch to five inch neon bulb; and a light emitting diode (LED's). The at least two differently colored warning lights are fixedly attached to the motorized vehicle at a location to be selected from: the front corners of the bumpers, the front corners of the fenders, on the front and or rear license plates, the motorized vehicle dashboard facing forward, the rear window, and any combination thereof.

The adjustable vacuum sensing device is particularly calibrated to distinguish between: (1) a low vacuum induced by the act of acceleration, (2) a high vacuum reading induced by the act of deceleration, and (3) an intermediate vacuum induced by constant velocity.

The at least two colored lights are fixedly attached to said motorized vehicle, whereby: the first of the at least two said lights is configured to correlate with the act of acceleration and constant velocity by:
1. turning on when the vacuum measured by said vacuum device correlates with said low and intermediate vacuums; and The second of the at least two said lights is configured to correlate with the act of deceleration by:
1. turning on when the vacuum measured by said vacuum device correlates with said high vacuums; and
2. turning off when the vacuum measured by said vacuum device does not correlate with said high vacuums.

In yet another aspect, the present invention includes an apparatus for automatic acceleration, deceleration and warning lights early warning system for motorized vehicles as set forth above, wherein an optional flasher can be installed in order to pulse on and off said light configured to turn on during said act of deceleration.

In another aspect, the present invention is a method for the construction and installation of an automatic acceleration, deceleration, and warning light system for motorized vehicles comprising:
a. drilling at least one hole into the intake manifold;
b. inserting, threading, and securing a fixture to said intake manifold whereby the fixture is further configured to support mounting a reinforced vacuum hose to said fixture;
c. fixedly attaching an at least one adjustable vacuum sensing device to said reinforced vacuum hose;
d. mounting said at least one adjustable vacuum sensing device to the internal engine well fender;
e. providing power to the at least one adjustable vacuum sensing device by connecting said vacuum sensing device with a suitable power supply selected from the group consisting of an ignition solenoid, a battery, or the fuse box; and
f. connecting an at least one colored light associated with a braking and/or non-braking condition to said at least one adjustable vacuum sensing device such that said vacuum device may selectively turn on said deceleration light.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

The present invention relates to a light signaling system apparatus for motor vehicles and a process for installing said system. This invention relates to a light signaling system for motor vehicles wherein the lights may be positioned in any location on any motorized vehicle. Specifically a vacuum sensing device is incorporated into an internal combustion engine such that the vacuum sensing device completes a circuit and turns on a desired light when a driver accelerates, decelerates, or maintains a constant velocity in order to alert others of the driver's intentions.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles, defined herein may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the figures included herein are illustrated diagrammatically and without any specific scale, as they are provided as qualitative illustrations of the concept of the present invention.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents that are filed concurrently with this specification and are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The application of the present invention is to provide a simple and relatively inexpensive apparatus and process comprised of a vacuum sensor and coordinated colored lights for alerting pedestrians and fellow motorist of a driver's intention to warning or to speed up. The present invention is an improvement over the prior art as it relies on a reliable low tech means of alerting others of a potential breaking situation without aggravating the driver of the automobile with automated alerts.

Specifically, the apparatus for automatic acceleration, deceleration and warning lights early warning system for motorized vehicles alerts passing, leading or following vehicles, and pedestrians of a user's intent to: continue their current velocity and direction, to warning, or to accelerate. Being alerted to the user's intent, drivers in a vehicle following the vehicle are able to stay a safe distance behind. Further, pedestrians at crosswalks are also alerted to a driver's intention to warning or not to warning before entering or while in the intersection.

These objectives will be accomplished by a constant signaling colored light emanating from the equipped motorized vehicle. In particular, any vehicle with a combustion engine may be equipped during the manufacturing process or as a retrofit on an existing engine with a single or a plurality of adjustable or non-adjustable vacuum sensing devices. The adjustable or optionally non-adjustable vacuum sensing device may be attached to the fender well of the engine compartment or another suitable location in any configuration that may reduce vibration due to the engine or road conditions. The job of the adjustable or optionally non-adjustable vacuum sensing device is to detect the following conditions:

1) a low vacuum induced by the act of acceleration;
2) a high vacuum induced by the act of deceleration; and
3) an intermediate vacuum induced by constant velocity.

These three states may be sampled using a single adjustable or non-adjustable vacuum sensing device. A typical vacuum sensing device is most likely comprised of two or more twelve volt (12V) input blades or screws for its source of power. Another lead is attached to at least one signal warning light. One lead from each switch goes to the power source the power source, to be selected from any of the following: the ignition solenoid, the vehicle battery, or the fuse box. Upon activation of the ignition key, the vacuum switch is energized. Multiple or a single vacuum sensing devices may be utilized.

In a configuration applying a plurality of vacuum sensing devices, the second blade from a first vacuum sensing device switch is run to at least one amber signaling warning light while the second blade from a second vacuum sensing device switch is run to at least one green signaling warning light. The first switch is set for a high vacuum while the second device is set for a low vacuum. If two switches are used, a Y shaped nipple can be used or two holes drilled and tapped into the engine intake manifold. Said vacuum switches can be of the fixed or adjustable type, the adjustable being preferred because of the difference in vacuum pull from one engine type to another. The adjustable vacuum switch is also the preferred type due to variations between new and older engines. For example, as engines wear, vacuum pull decreases. Readjusting the switches to take into account such wear is a simple matter of a screw adjustment. Such switches are readily available.

In a configuration applying a single vacuum sensing device, optionally a double sided double diaphragmed sensing device to control two different colored warning lights, the single vacuum sensing device switch is run to at least one amber warning light while the third blade from the double sided vacuum sensing device switch is run to at least one green warning light. A first switch is set for a low vacuum while a second switch is set for a high vacuum. Said vacuum switches can be of the fixed or adjustable type, the adjustable vacuum switch being preferred because of the difference in vacuum pull from one engine type to another. A single ported double diaphragmed vacuum snap switch may be used with two adjustable screws for the single vacuum sensing device configuration. This embodiment would require only one vacuum hose and only one hole to be drilled into the intake manifold.

Either the single or plurality of vacuum sensing devices may further be configured such that each switch is capable of delivering enough voltage and amperage such that only one device is required to supply enough energy for all the bulbs, Light Emitting Diodes (LED's), or neon lights which further comprise the acceleration, deceleration and warning lights system for motorized vehicles.

If bulbs are used, (high in the rear) the bulb housing should be ventilated and of good thermal conductivity in order to dissipate any heat build up. LED lights as well as neon lights produce hardly any heat, and may be preferred in some instances where lower current and voltage demands exist. LED's have recently been improved for both longevity and brilliance. The light system may optionally include a breaker system in order to flash a particular colored light on the circuit, having the desired affect of alerting a fellow motorist or pedestrian of the driver's intention.

An apparatus for constructing and retrofitting the automatic acceleration, deceleration, and warning light system for motorized vehicles is also provided. It should be noted from the conversion above that the vacuum installation process may be specifically adapted to the number and type of vacuum sensing devices being employed. First a hole should be drilled into the engine intake manifold. Multiple holes may be required in order to accommodate multiple vacuum sensors. Once a hole has been placed through the engine intake manifold, a second step of inserting, threading, and securing a fixture to said intake manifold is done. The fixture may further be configured to support mounting a reinforced vacuum hose to the fixture. In a third step, the vacuum hose is fixedly attached to the adjustable or non-adjustable vacuum sensing device to the reinforced vacuum hose secured to the intake manifold. Optionally, if a plurality of vacuum sensing devices are employed, the third step may include securing the vacuum hoses to the plurality of adjustable or non-adjustable vacuum sensing devices. In the fourth step the at least one adjustable vacuum sensing device may be mounted to the internal engine well fender or other suitable location whereby vibration due to the engine may be reduced. In the fifth step, power is provided to the at least one adjustable vacuum sensing device by connecting said vacuum sensing device to a suitable power supply selected from the group consisting of an ignition solenoid, a battery, and the fuse box. This step may further comprise calibrating the vacuum sensing device or devices to detect specific vacuum ranges. At this point the vacuum sensing device or devices is/are now configured such that they may be able to detect and respond to a particular vacuum range. In a sixth and final step, the at least one adjustable vacuum sensing device may be connected such that the at least one colored light associated with a braking and/or non-braking condition may selectively turn on the desired warning light.

Figure 1:
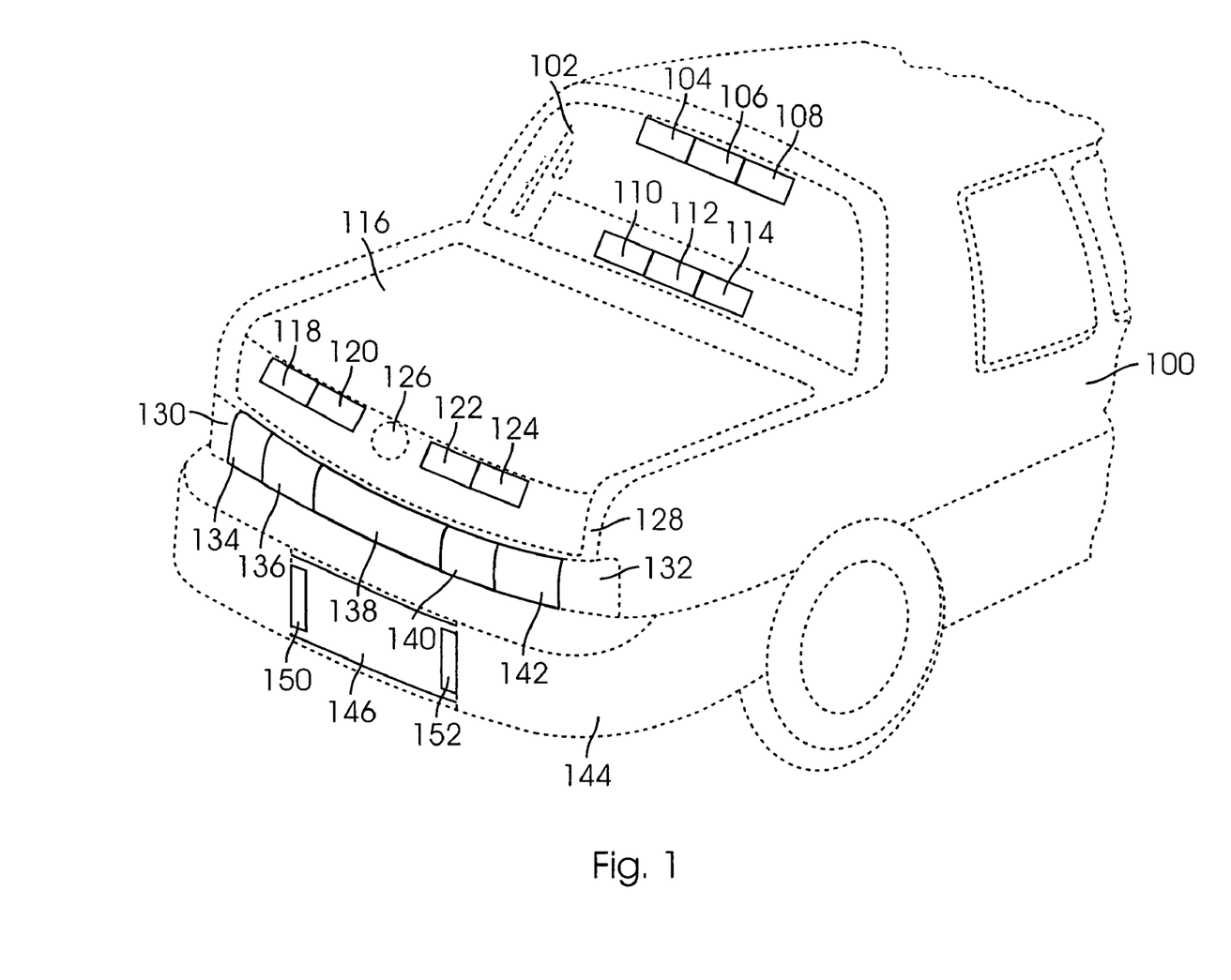
FIG. 1 is a graphical representation of the back view of a vehicle, displaying locations for the placement of the acceleration, deceleration and light signaling system lights of the present invention.

Referring to FIG. 1, an illustration depicting the back half of an automobile is shown displaying a variety of possible locations for the acceleration, deceleration warning lighting system. The vehicle 100 is equipped with a rear window shield 102 with a top amber warning light 104, a top red warning light 106, and a top left green warning light 108. At the bottom of the back window shield 102, a bottom amber warning light 110, a bottom red warning light 112, and a bottom left green warning light 114 are shown place above the trunk 116 of the vehicle 100.

Mounted on the trunk 116 to the left and right side of the trunk key hole 126 are a left green trunk cruising light 118, a left amber deceleration trunk warning light 120, a right amber trunk deceleration warning light 122, and a right green trunk cruising light 124. Below the trunk 116, a back panel 128 is shown with warning lights between the left turn signal 130 and right turn signal 132.

Specifically, there is an optional configuration of a left green back panel light 134, a left amber back panel light 136, a centrally placed red back panel warning light 138, a right amber back panel light 140, and a right green back panel light 142. The back bumper 144 is shown optionally equipped with a back license plate 146 equipped with a left LED 150 and right LED 152 license plate bolts. The left LED 150 may also be an amber neon bulb 150 and green neon bulb 152.

Figure 2:
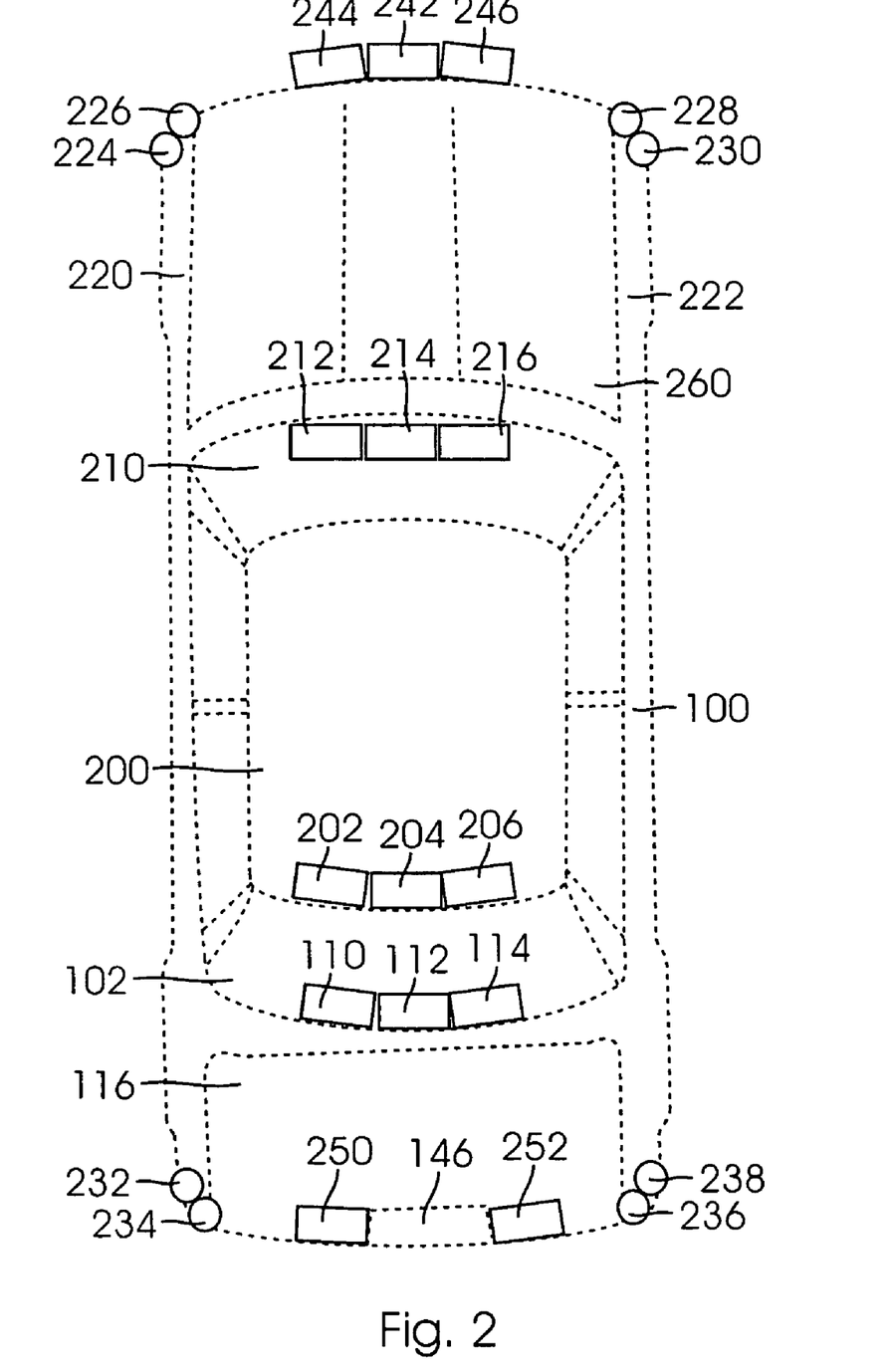
FIG. 2 is a graphical representation of the top view of a vehicle displaying locations for the placement of the acceleration, deceleration and light signaling system lights of the present invention.

Referring to FIG. 2, an illustration depicting a top view of an automobile is shown displaying a variety of possible locations for the acceleration, deceleration break lighting system. Particularly the roof 200 of the vehicle is shown equipped with a left amber roof light 202, a centrally placed red roof light 204, and a right green roof light 206. At the bottom of the back window shield 102, a bottom amber deceleration warning light 110, a bottom red warning light 112, and a bottom left cruising light 114 are shown placed above the trunk 116 of the vehicle 100. The back portion of the left side panel 220 is shown with another configuration of left back panel amber light 232 and green light 234. Similarly, the back portion of the right side panel 222 is shown with another configuration of left back panel amber light 238 and green light 236. Positioned below the trunk 116, the license plate 146 is shown equipped with a left amber neon deceleration warning light 250 and a right green neon cruising light 252.

Referring now to the front portion of the vehicle 100, the front portion of the left side panel 220 is shown with a left front panel amber light 226 and green light 224. Similarly, the front portion of the right side panel 222 is shown with left front panel amber deceleration warning light 228 and green cruising light 230. Located below the hood 260, the license plate 242 is shown equipped with a left amber neon deceleration warning light 244 and a right green neon cruising light 246. These can also be LED license plate bolts which are amber and green or small license plate neon bulbs.

Figure 3:
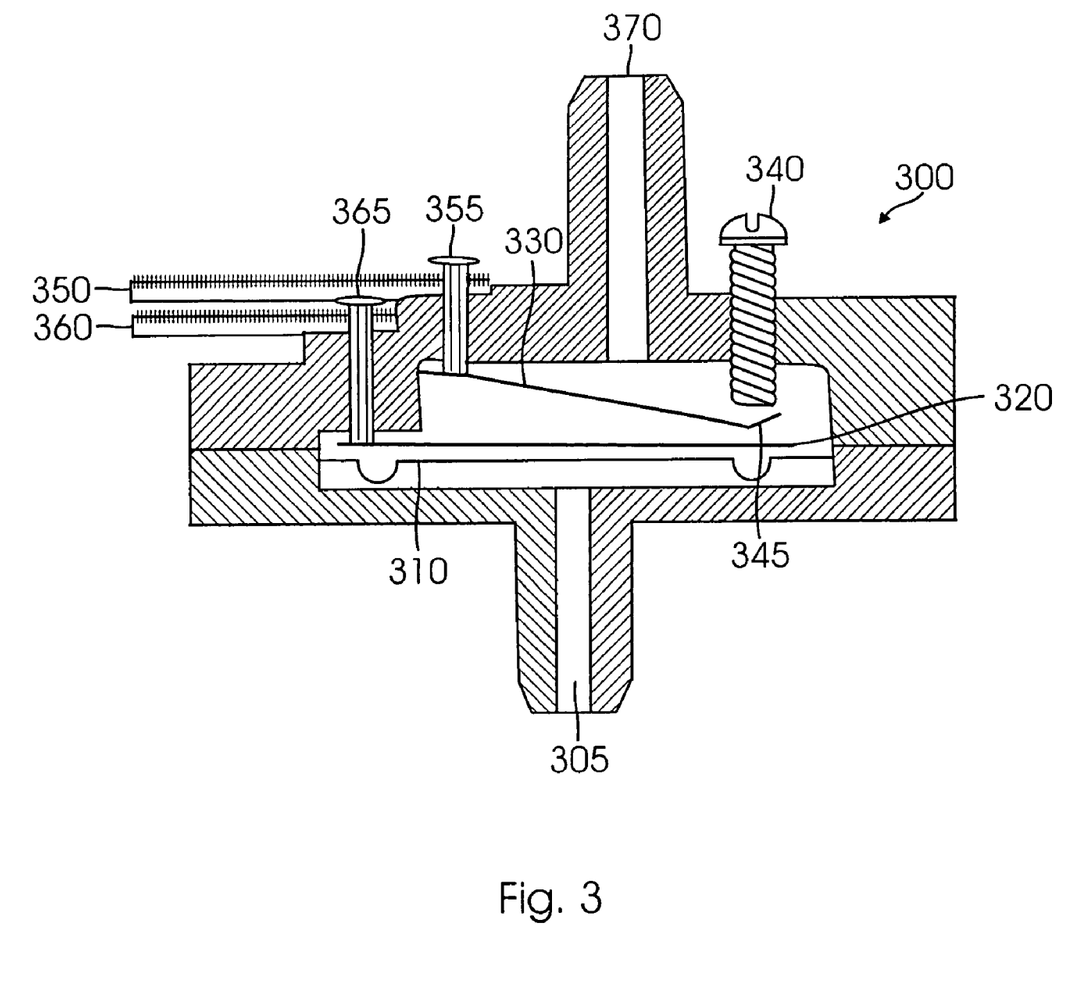
FIG. 3 is a graphical representation of an adjustable vacuum sensing device displaying a single output.

Referring to FIG. 3, there is illustrated a side view of a normally open diaphragm vacuum device 300. The operation of the diaphragm vacuum device 300 allows vacuum to build up in the vacuum pressure port 305 and act against the diaphragm 310, causing the cantilevered contact blade 320 to deflect up. The amount of deflection is a function of the contact blade 320 thickness and the amount of vacuum exerted against the diaphragm 310. The contact blade 320 deflects until it contacts the sharp points 345 of the fixed adjustable blade 330. The position of connection between the contact blade 320 and the adjustment blade 330 is determined by an adjustment screw 340 which varies the position of the relatively rigid adjustment blade 330 toward the contact blade 320. The electrical circuit is from one terminal 350, through the rivet 355 to the adjustable contact blade 330; and from the other terminal 360 through the rivet 365 to the contact blade 320. When the desired vacuum is achieved the moveable contact 320 completes the circuit by making a connection with the adjustment contact 330. The normally open diaphragm vacuum device 300 is also equipped with a vacuum port 370 and may be configured with an additional adjustable screw 340, two independent adjustment contacts 330, and a single common contact blade 320 for controlling multiple lights required to operate at different vacuums. The port 305 is open to atmospheric pressure.

Figure 4:
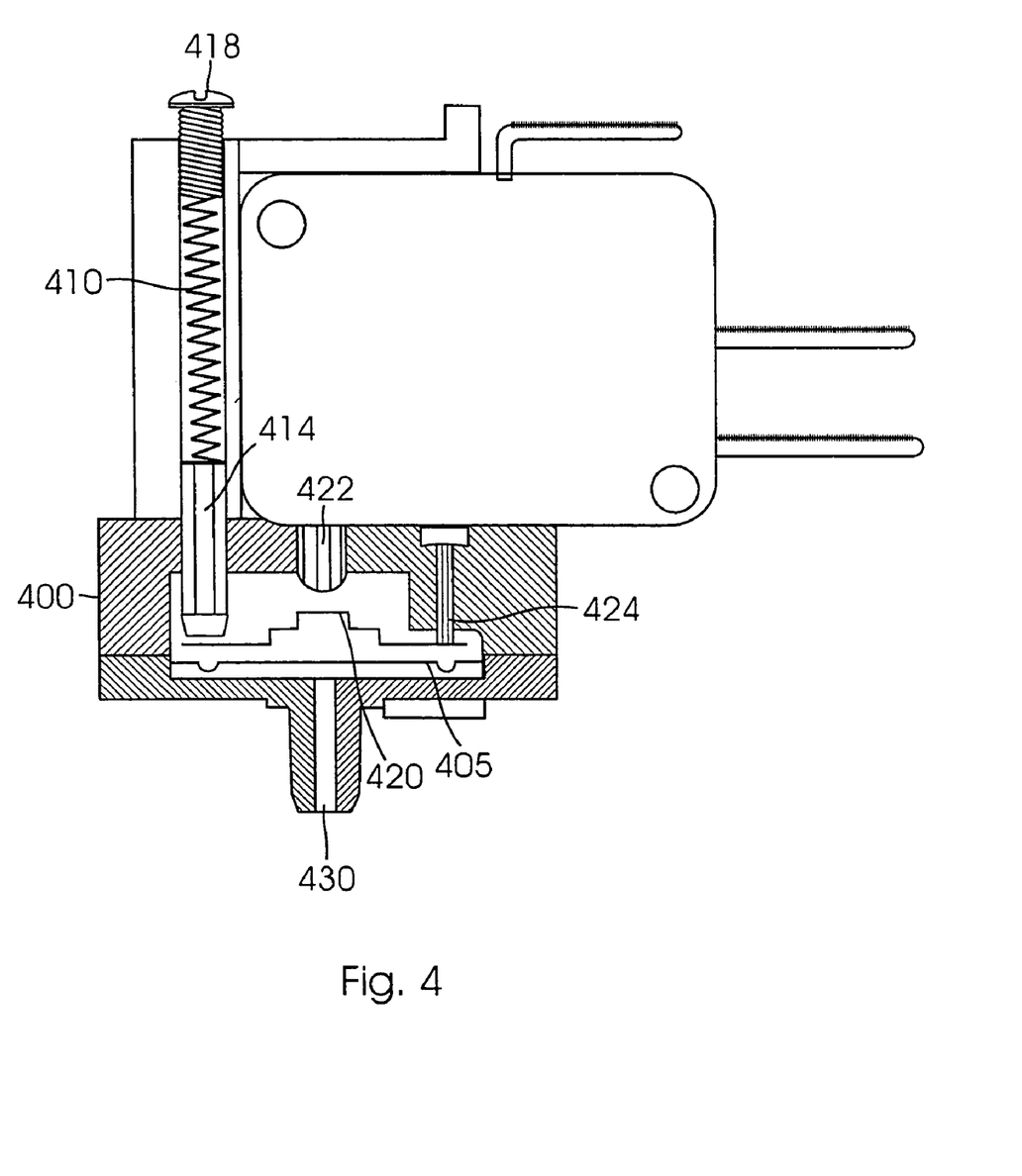
FIG. 4 is an illustration of an oil pressure spring actuated sensor.

FIG. 4 refers to an oil based pressure system with a possible spring actuated pressure sensor 400 is shown. In the spring actuated pressure sensor 400, the device is diaphragm 405 operated and actuated by a spring loaded pin 414. An adjustment screw 418 allows an installer to set the pressure setting to a desired range. Such devices exist that may be further equipped with additional independent diaphragms 405. The spring actuated pressure sensor 400 is activated when fluid pressure entering through oil pressure port 430 acts against the diaphragm 405 and causes a guided disc 420 to contact the snap acting device actuator button 422. The disc 420 has a rivet 424 to prevent excessive travel of the actuator button 422. The adjustment screw 418 is used to adjust the actuation setting in order to oppose the force of the pressure acting against the diaphragm 405.

Each vacuum device has two or more twelve vault (12V) input blades or screws for its source of power. One lead from each device goes to the power source, it being the ignition solenoid or battery, or the fuse block. Upon activation of the ignition key the vacuum devices are energized. The second blade from the first vacuum device is run to the amber light. The first device being set for a high vacuum. An optional flasher can be installed on the amber light causing it to be even more noticeable. The second blade from the second device is to run to the green lamp. It being set to the vacuum pull of the engine at low to cruising speeds. Upon depressing the accelerator pedal the engine revolutions increase, vacuum will drop. Upon releasing pressure on the gas pedal the vacuum will go very high. Cruising causes vacuum pull to be in the medium to low range. The device set for low to medium will close and flash the green light indicating to other vehicles that the driver in front has no intention of decelerating or stopping.

Upon lifting ones foot from the accelerator pedal a high vacuum results lighting the amber light. This warns the following driver a braking instance may be about to occur. This causes the following drivers reaction time to be greatly enhanced.

A flashing amber light would be even more noticeable. When one foot is off the gas pedal, the regular warning light is energized. Any driver knows a slow down or a stop is occurring. This system provides a vehicle with daytime running lights as well (DRL's). Something not standard fare in the USA. Nevertheless, safety wise it is desirable. Each device is independent of the other, though they share the same power source. These devices are not expensive, especially when compared to collisions or struck pedestrians.

A simple system such as this only an occasional bulb or vacuum device need be replaced. Engine wear is easily adjusted by a screw in the device. Below is an example of a Chrysler v8 engine with one hundred thousand (100,000) miles on it.
1. Green at 55 mph=15 ½ inches of vacuum (normal)
2. Green at 65 mph=13-14 inches of vacuum
3. Green at acceleration up a hill=10 inches of vacuum
4. Green Rapid level acceleration to 60-65 mph=10 inches
5. Green steady 60 mph=15 to 16 inches of vacuum
6. Green steady at 70 mph=10 to 13 inches of vacuum
7. Amber deceleration=20 to 25 inches of vacuum
8. Green upon start up of engine vacuum is low then rises
9. Red coming to a stop=amber then red It should be noted that driving along the gas acceleration pedal will constantly be eased up on. That is when the amber bulb will flash alerting the following driver of a possible braking incident may occur. Most of the time the vehicle will reaccelerate going to green. No bells or buzzers are needed. This means vehicles will remain more affordable for the general public. Also with less costly electronics to eventually repair or replace. The public benefits. There also would be no rewiring on older vehicles.

A kit of this invention can be made for the average handyman to do a home installation on vehicles of prior manufacture, most simply on the license plates with either high or low glow 3 inch to five inch neon bulbs. This particular type of installation can go well on newly manufactured vehicles at very low cost and with no interference to any body design. Neon bulbed license plate holders are presently being made in one color but can easily be made with amber or green included. Each color shares one half of the license plate frame or plate itself. This would not require an expert installer. No prior art system is as easy to install and is so effective. These particular colors are universal to everyone, even world wide. Rear high central warning lights have greatly cut down on rear end accidents. The present invention system would be an even greater solution to rear end collisions. In contrast to prior art systems that simply warn a driver by alarms etc. that he is about to be hit, the concept of the present invention is to warn or caution the driver of the other vehicle before the collision actually occurs. Hopefully this invention becomes standard world wide. The inventor of the present invention believes that if this system becomes standard around the world, it will greatly improve communications between vehicles and also between a driver and pedestrians.

Small micro-fans can be used in housing having regular bulbs. LED lights can be seen on some vehicles today. If installed on front bumpers or fenders, heat presents no problems even with bulbs. Various kinds of lights can be intermixed with no problems. No prior art is this simple and compact. All other prior art requires the services of skilled expensive installers at the factory. Almost all vehicles with internal combustion engines can employ the system of the present invention.

Illustrations will show that the present invention is designed to be foolproof, simple and compact and is also highly visible in the daytime. It is completely independent of other signals on the vehicle. One or more light sources will always be visible to communicate with others.

The system is not sensitive to any of the vehicle's inclination, either from road angles or the vehicle's suspension due to the load vehicleried. The driver of a closely following vehicle upon being alerted to the intent of a vehicle utilizing the present invention, can discriminate accordingly. Additionally, at intersections with or without traffic signals or stop signs, the system can alert approaching pedestrians or other vehicles whether the approaching vehicle's driver intends to slow down, stop, or go through. Vehicles traveling in the same direction (right or left side) can be cautioned if the vehicle ahead of it is slowing down or stopping for a pedestrian who has entered the crosswalk but cannot yet be seen. If a manufacturer installs these lights in the front as well, a driver seeking to change lanes, either left or right, could tell if his directional signal is being acknowledged by the vehicle behind him by merely observing the following vehicle's colored lights. If they flash amber the driver is slowing down and intends to allow the following vehicle to change lanes. If the lights flash green, then the driver is not allowing the following vehicle to change lanes. The possibility of lane change collisions is thereby greatly reduced.

The same signal also warns pedestrians that a vehicle intends to stop or go through the intersection when the pedestrian is crossing a street.

These devices are not expensive, especially when compared to collisions with vehicles or pedestrians. This means vehicles will remain more affordable for the general public. There also would be no rewiring required on older vehicles.

Reaction time will be greatly enhanced for following vehicle's drivers, greatly decreasing rear end collisions. This system would therefore greatly decrease unnecessary death, suffering, and large monetary loss due to accidents throughout the world.

Additionally, oil pressure systems can also be applied to automatic transmissions, although they are not as desirable as vacuum systems. A system may also be set up by the use of pressure devices from the vehicle's engine oil system. It should be pointed out that this would not be nearly as quick or accurate as a vacuum system. Oil pressure rises and falls rather slowly. The quick vacuum system is preferable.

Of course the present invention is not intended to be restricted to any particular form or arrangement, or any specific embodiment, or any specific use, disclosed herein, since the same may be modified in various particulars or relations without departing from the spirit or scope of the claimed invention herein above shown and described of which the apparatus or method shown is intended only for illustration and disclosure of an operative embodiment and not to show all of the various forms or modifications in which this invention might be embodied or operated.

What is claimed is:
1. An apparatus for automatic acceleration, deceleration and warning lights early warning system for motorized vehicles comprising:
   a. a motorized vehicle with an internal combustion engine wherein the intake manifold is configured with a plurality of adjustable vacuum sensing devices calibrated to a particular engine wherein said plurality of adjustable vacuum sensing devices are configured to selectively turn on and off at least two differently colored warning lights;
b. said differently colored warning lights are selected from a group consisting of light bulbs, a high glow three inch to five inch neon bulb, a low glow three inch to five inch neon bulb; and a light emitting diode (LED's);
c. said at least two differently colored warning lights are fixedly attached to the motorized vehicle at a location to be selected from the front corners of the bumpers, the front corners of the fenders, on the front and or rear license plates, the motorized vehicle dashboard facing forward, and any combination thereof;
d. one of said plurality of adjustable vacuum sensing devices is particularly calibrated to discern a low vacuum induced by the act of acceleration of the vehicle and an intermediate pressure induced by constant velocity of the vehicle;
e. a second of said plurality of adjustable vacuum sensing devices is particularly calibrated to discern a high vacuum induced by the act of deceleration of the vehicle;
f. at least two colored lights operating so that:
  i. the first of the at least two said colored warning lights is configured to correlate with the act of acceleration and constant velocity by turning on when the vacuum measured by said vacuum device correlates with said low and intermediate vacuums
  ii. the second of the at least two said colored warning lights is configured to correlate with the act of deceleration by:
    (1) turning on when the vacuum measured by said vacuum device correlates with said high vacuum; and
    (2) turning off when the vacuum measured by said vacuum device no longer correlates with said high vacuum.

2. An apparatus for automatic acceleration, deceleration and warning lights early warning system for motorized vehicles as set forth in claim 1, wherein an optional flasher is installed in order to pulse on and off said light configured to turn on during said act of deceleration.

3. An apparatus for automatic acceleration, deceleration and warning lights early warning system for motorized vehicles comprising:
a. a motorized vehicle with an internal combustion engine wherein the intake manifold is configured with an adjustable vacuum sensing device calibrated to a particular engine wherein the adjustable vacuum sensing device is configured to selectively turn on and off at least one warning light;
b. said lights are selected from a group consisting of light bulbs, a high glow 3 inch to five inch neon bulb, a low glow 3 inch to five inch neon bulb; and a light emitting diode (LED's);
c. said at least two differently colored warning lights are fixedly attached to the motorized vehicle at a location to be selected from the front corners of the bumpers, the front corners of the fenders, on the front and or rear license plates, the motorized vehicle dashboard facing forward, and any combination thereof;
d. said adjustable vacuum sensing device is particularly calibrated to distinguish between:
  i. a low vacuum induced by the act of acceleration of the vehicle;
  ii. a high vacuum induced by the act of deceleration of the vehicle; and
  iii. an intermediate vacuum induced by constant velocity of the vehicle;
e. said at least two colored lights operating so that:
  i. the first of the at least two said lights is configured to correlate with the act of acceleration and constant velocity by:
    (1) turning on when the vacuum measured by said vacuum device correlates with said low and intermediate vacuums;
  ii. the second of the at least two said lights is configured to correlate with the act of deceleration by:
    (1) turning on when the vacuum measured by said vacuum device correlates with said high vacuum; and
    (2) turning off when the vacuum measured by said vacuum device no longer correlates with said high vacuum.

4. An apparatus for automatic acceleration, deceleration and warning lights early warning system for motorized vehicles as set forth in claim 3, wherein an optional flasher is installed in order to pulse on and off said light configured to turn on during said act of deceleration.

5. An apparatus for automatic acceleration, deceleration and warning lights early warning system for motorized vehicles comprising:
a. a motorized vehicle with an internal combustion engine wherein the intake manifold is configured with an adjustable vacuum sensing device, which measures high, low, and intermediate vacuums and is calibrated to a particular engine wherein the adjustable vacuum sensing device is configured to selectively turn on at least one colored deceleration warning light;
b. a first colored warning deceleration light and a second colored warning light, each attached to at least one location on said vehicle;
c. said first colored warning light and said second colored warning light each fixedly attached to the motorized vehicle at a location to be selected from the front corners of the bumpers, the front corners of the fenders, on the front and or rear license plates, the motorized vehicle dashboard facing forward, and any combination thereof;
d. said first and second colored warning lights operating so that:
  i. the first colored warning light is configured to correlate with the act of acceleration and constant velocity by:
    (1) turning on when the vacuum measured by said vacuum device correlates with said low and intermediate vacuums;
  ii. the second colored warning light is configured to correlate with the act of deceleration by:
    (1) turning on when the vacuum measured by said vacuum device correlates with said high vacuum; and
    (2) turning off when the vacuum measured by said vacuum device no longer correlates with said high vacuum.

* * * * *